Figure 1:
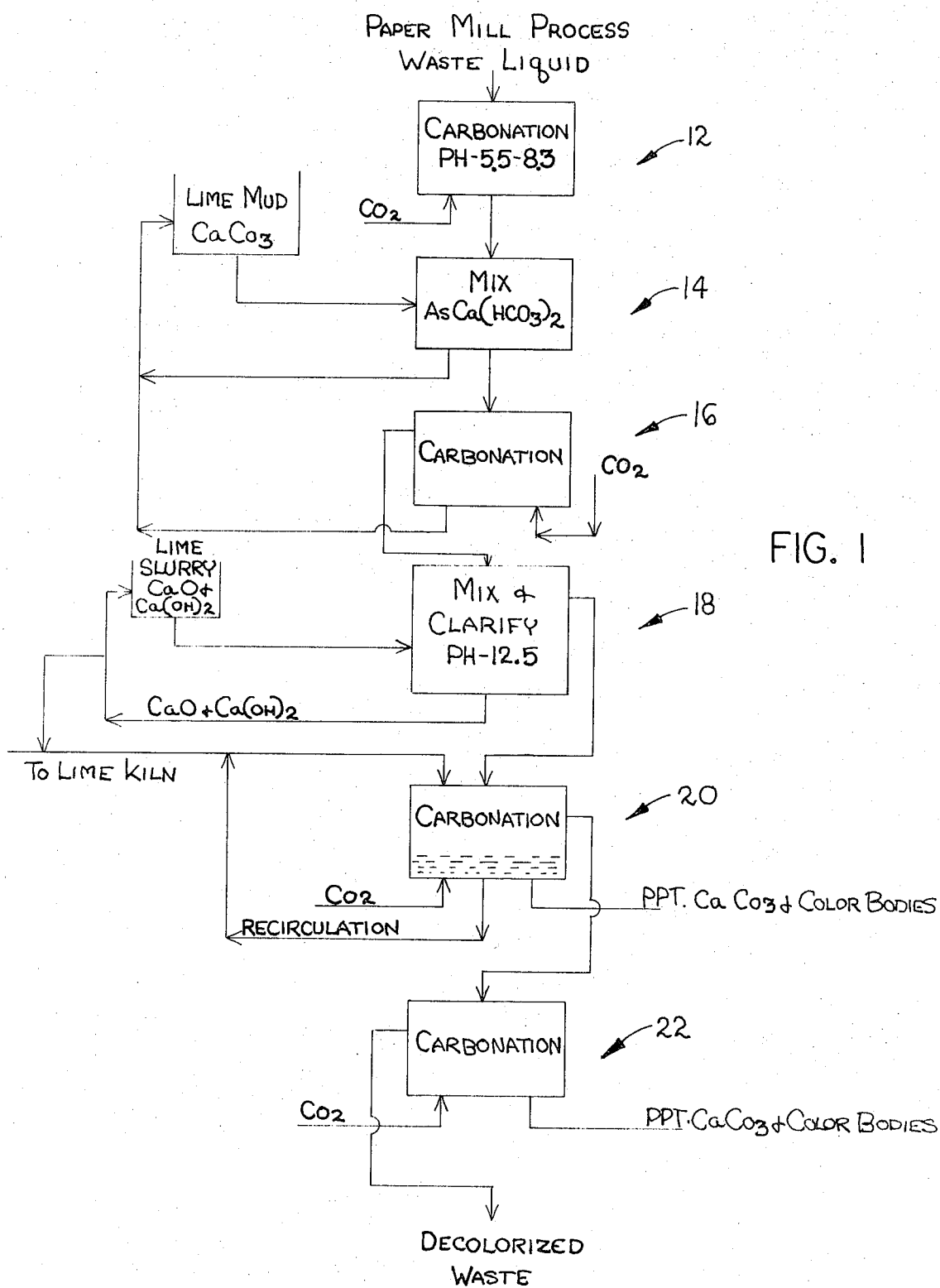

United States Patent [19]
Croom

[11] 3,833,463
[45] Sept. 3, 1974

[54] METHOD OF DECOLORIZING WASTE PROCESS LIQUID DISCHARGED BY A PAPER MILL

[75] Inventor: Hardy C. Croom, Valdosta, Ga.
[73] Assignee: Owens-Illinois, Inc., Toledo, Ohio
[22] Filed: Oct. 26, 1972
[21] Appl. No.: 301,132

[52] U.S. Cl. ................ 162/29, 162/189, 210/51, 210/53
[51] Int. Cl. .............................................. D21c 11/00
[58] Field of Search ........... 162/29, 30, 38, 45, 189, 162/190; 210/45, 52, 51, 53; 423/158, 160, 165, 427, 432

[56] References Cited
UNITED STATES PATENTS
| | | | |
|---|---|---|---|
| 2,801,264 | 7/1957 | Thomsen | 162/38 X |
| 3,262,877 | 7/1966 | Le Compte, Jr. | 162/190 |
| 3,639,206 | 2/1972 | Spruill | 162/29 |

Primary Examiner—S. Leon Bashore
Assistant Examiner—William F. Smith
Attorney, Agent, or Firm—Henry P. Stevens & Edward J. Holler

[57] ABSTRACT

Discolored process waste liquid from a paper mill containing ecologically undesirable color bodies is subjected to a sequence of process steps serving, in aggregate, to reduce and/or eliminate the color bodies, said sequence of steps including (1) a carbonation of the waste liquid to adjust the pH to approximately neutral, (2) an addition of lime mud (principally calcium carbonate) which in the presence of carbon dioxide tends to form soluble calcium bicarbonate, (3) an optional secondary carbonation to counteract lime mud alkalinity and promote high calcium concentration, (4) a mixing clarifier addition of a slurry of lime (principally calcium oxide and calcium hydroxide), raising the pH and precipitating calcium carbonate, clarifier bottom slurry being recycled to lime slurry and bled to kiln, and (5) a carbonation of clarifier effluent with carbon dioxide to lower the pH and to react with remaining calcium to form and remove calcium carbonate and conjoint agglomeration of residual color bodies, yielding an essentially color-free effluent. The process also envisions recycling of various streams, thereby providing continuousness of the process.

13 Claims, 2 Drawing Figures

METHOD OF DECOLORIZING WASTE PROCESS LIQUID DISCHARGED BY A PAPER MILL

The present invention relates to the manufacture of paper and particularly that segment of paper manufacture commonly referred to as pulping. Pulping, considered overall, generally comprises the conversion of the lumber to rolls of paper in sheet form. The wood is reduced in size to chips and thereafter digested physically, semi-chemically or chemically to a pulp of the cellulose fibers which are thereafter laid down via a Fourdinier machine, the water extracted and the sheet collected, dried and rolled. In the breakdown of the wood to the cellulose as referred to, a variety of chemicals are frequently employed. These include sodium sulfate, sodium sulfite, sodium sulfide and alkaline metal bisulfite. The chemicals attack the lignins and other bonding constituents which hold the cellulose fibers together in the wood chip.

The pulping operation also generally includes chemical recovery which is practiced in the interest of efficiency and economy. Thus, over the years, it has been found that certain of the values, particularly sodium values, can be treated and recovered and recycled together with makeup chemicals. All of these processes or operations result in overflow water which is discolored.

Pulping operations as conducted by the typical paper mill require tremendous amounts of water. The water, of course, comes into contact with the wood, with the pulping chemicals, with the by-products of the pulping chemicals, reaction with the binding constituents of the wood including lignin, etc., and therefore becomes quite contaminated and impure. Over and above this, in chemical recovery, certain streams of process liquid rich in chemicals are concentrated and ultimately incinerated in a kiln, with the solid products of combustion being redissolved in water such that the downstream water solubilizes the recovered chemical values present in the products of combustion. Certain of the undesired impurities in the water are biodegradable and technology exists for reducing these at least to acceptable levels. Techniques are also known for reducing the biological oxygen demand (BOD) created as a result of pulping and related operations.

Considering the amounts of water employed in pulping, the paper mill and related operations, it is desirable to either reuse the total water effluent or return it in a form that it can be directed to the source body or water such as a lake, river or the like. Most desirably, of course, the water should be returned in unpolluted form. Current national emphasis on the abatement of stream pollution is well known.

Of course, discoloration in water is esthetically objectionable, particularly where the water is used as a source of water supply for urban communities, either for drinking or, for that matter, recreational usage. The coloration in pulping process liquid effluent is composed largely of what is referred to as color bodies. These are lignins, tannins and related organic polymers which are by-products of the chemical attack of pulping chemicals on the bonding constituents which hold the cellulose components of the wood together. These are frequently long chain, resinous complexes formed by the reaction of the pulping chemicals with the lignin, as indicated. According to one explanation, the color bodies are formed by the combination of calcium ion with phenolic groups and enolic groups which result from and are products of the hydrolysis of lignin. These color bodies or complexes are extremely small, colloidal in size actually, which makes their removal difficult to accomplish. It has been known for some time that massive additions of lime or hydrated lime composed principally of calcium oxide and calcium hydroxide is effective in accomplishing isolation and agglomeration of the color bodies. Other chemical coagulants and adsorbents have also been investigated as a means of removing color from water. Cost, however, is prohibitive and frequently the result is an unmanageable sludge. The massive lime treatment is not ideal as a solution to effluent color removal because economic considerations can frequently effect a reduction in the relatively expensive lime concentration, in which case the result is the formation of a gelatinous lime-organic sludge which is difficult, if not impossible, to dewater by filtration or other means. It has been theorized that the dewatering properties of the lime-organic sludge is caused by the organic matter adsorbed or reacted on the surface of the calcium hydroxide which is necessarily present in the slurry of lime. To reiterate, the excess or massive lime treatment technique is not desirable since large amounts of expensive lime are necessary to provide the lime concentration which is sufficient to overcome the unmanageable gelatinous lime-organic complex.

With the above general introduction, it is herein stated to be an object of the present invention to provide an overall system designed to accomplish efficient removal of color bodies from process waste liquid effluent from a paper mill including pulping waste liquid and machine room waste liquid.

It is also an object of the present invention to provide a method comprising a sequence of steps which is conveniently incorporated into an existing pulping system and which employs a particular sequence of operations that provide color removal at an economically acceptable level.

It is a significant object of the present invention to provide a method of treating waste process liquid which features a sequence of steps which can be carried out without extensive modification but rather employing existing mill equipment.

It is still another object of the present invention to provide a method as above described featuring a novel sequence of steps which embodies fundamental unit operations and equipment; said sequence providing achievement of desired ends.

As indicated, the present invention particularly envisions and is accomplished by passing paper mill waste process liquid through a sequence of steps including (1) carbonation of the process liquid to a generally neutral pH, (2) addition of lime mud (principally calcium carbonate) together with intimate mixing contact to form soluble calcium bicarbonate, $Ca(HCO_3)_2$, (3) a secondary addition of carbon dioxide to arrive at a solution capable of containing the highest concentration of calcium ion, (4) addition, to the carbonated, high-calcium-ion solution, of a lime slurry composed of calcium oxide, $CaO$, and calcium hydroxide, $Ca(OH)_2$, resulting in a rise of pH to about 12, (5) clarification and separation of precipitate composed principally of calcium oxide and hydroxide which is recycled to the lime tank, (6) tertiary carbonation of clarifier effluent, reducing pH and precipitating calcium carbonate carrying agglomerated color bodies, and (7) a final carbon dioxide gas addition to achieve stabilization and lowering of pH to about 7.5, with further precipitate of calcium carbonate and color bodies. A portion of the step (5) recycle which also contains precipitated calcium carbonate and color bodies is bled to the lime kiln for burning.

The foregoing as well as other objects of the present invention will become apparent from the following detailed description taken in conjunction with the annexed sheets of drawings on which there is presented, for purpose of illustration only, a single embodiment of the present invention including a sequence of steps illustrated schematically on the one sheet and diagrammatically on the other sheet; the latter to illustrate particular apparatus employed in the sequence of steps.

IN THE DRAWINGS

Figure 2:
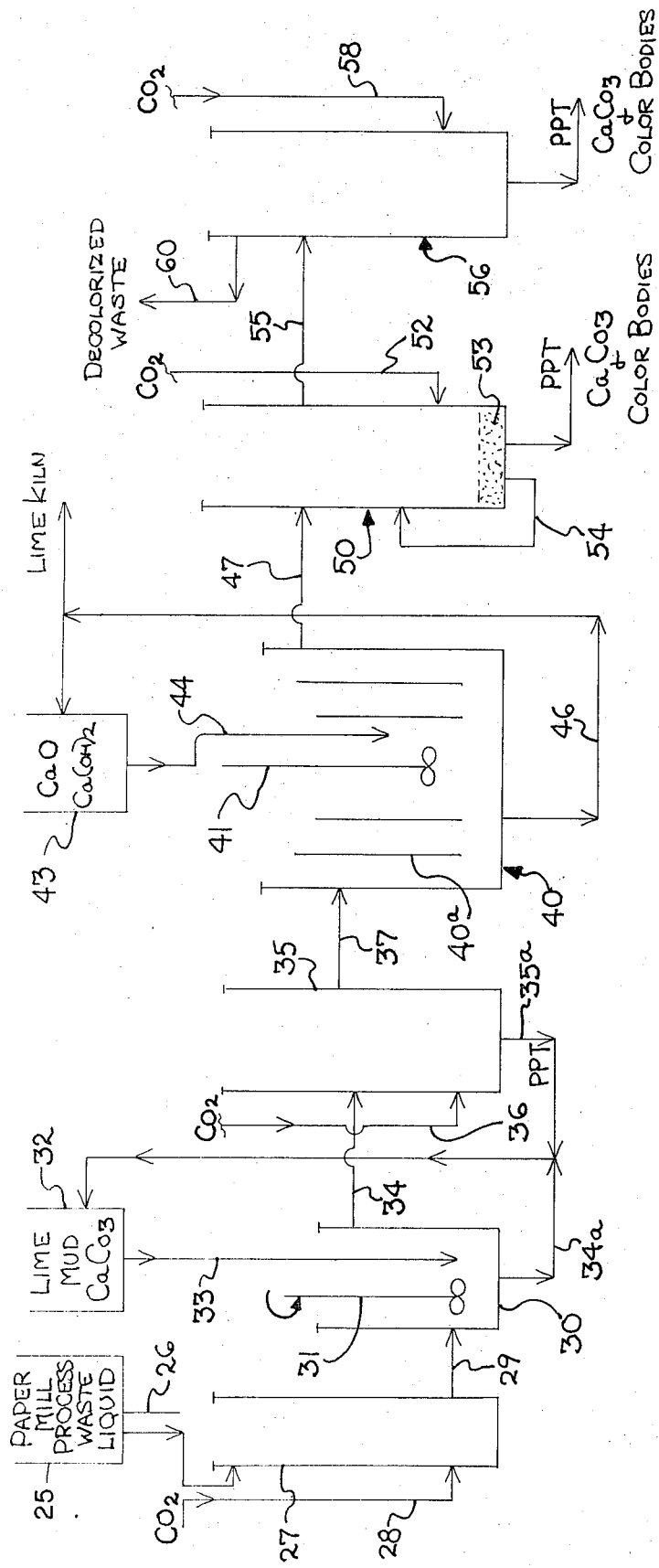

FIG. 1 is a schematic flow sheet of the movement of mill process waste liquid through a sequence of treatment steps identified and designated in block outline; and FIG. 2 is a diagrammatic side elevation view, in single line, of various apparatus components and single line piping illustrating the flow of the waste process liquid proceeding therethrough together with various additions and outputs.

Considered most simply, the present invention contemplates an improvement in the lime treatment of process waste liquid emanating from paper mill pulping and machine room. In accordance with the present invention, the process liquid prior to the addition of lime is carbonated at least once with gaseous carbon dioxide or equivalent and saturated with calcium ion by the addition of lime mud composed principally of calcium carbonate which, at the neutral pH induced by the addition of carbon dioxide, yields soluble calcium bicarbonate. Lime as CaO and including calcium hydroxide is added under conditions as to promote intimate mixing resulting in an elevation of the pH. Conjoint clarification of this slurry mixture results in a clarification effluent which is passed to a carbonation while the clarifier bottom liquid is recirculated to the lime source and reintroduced. The carbonation of the clarifier effluent lowers the pH and continuation of the precipitation of a fluffy calcium carbonate precipitate and conjoint agglomeration separation of color bodies. The carbonated effluent is subjected to a secondary carbonation; the precipitated solids and color bodies being directed to the lime kiln for burning and recovery. The carbonated effluent is essentially colorless and of neutral pH and therefore suitable for return to the source or for reuse without harm to apparatus.

Reference may now be had to FIG. 1 for a schematic block and line diagram illustrating the flow of the paper mill process waste liquid through the sequence of steps constituting the present invention and designed and calculated to substantially eliminate the color bodies present in the waste liquid. The waste liquid is carbonated as at 12 by the introduction of gaseous carbon dioxide to effect reduction in the pH to approximately the indicated range of 5.5 to 8.3. The carbonated liquid passes to a mixing tank 14 into which is also introduced lime mud composed principally of calcium carbonate and which is readily available in a paper mill. The lime mud is desirably sufficient in quantity to provide a plentiful excess of calcium carbonate stoichiometrically based on the amount of carbon dioxide employed in the earlier carbonation step and the calcium carbonate of which the lime mud is principally composed. The formed mixture is passed to a secondary carbonation as at 16 with carbon dioxide being introduced to further promote formation of soluble calcium bicarbonate and a liquid slurry highly concentrated as to calcium ion. Part of the throughput of mixture as at 14 and of the secondary carbonation at 16 is returned to the lime mud tank for reintroduction into mixing tank 14. The secondary carbonation effluent passes to a clarifier 18 into which is introduced a slurry of slaked lime composed principally of calcium oxide and calcium hydroxide, $Ca(OH)_2$, which causes a rise in pH to the approximate indicated value 12.5. The solids which are formed and settled in the clarifier are composed principally of calcium oxide and calcium hydroxide which are returned to the slurry supply tank, as indicated, for reintroduction into the clarifier 18. Clarifier effluent passes to carbonation step 20 to meet introduced carbon dioxide, causing a lowering of the pH and consequent precipitation of calcium carbonate and agglomerated color bodies. As illustrated, a portion of the carbonation liquid throughput in step 20 is recirculated, with a portion being bled off as needed or desired and directed to the lime kiln. The effluent from carbonation step 20 is carbonated again as at 22, with resultant precipitation of residual calcium carbonate and color bodies, with effluent constituting decolorized waste of essentially neutral pH and demonstrating color removals of 90 to 95 percent. The process and movement of the liquid as indicated in FIG. 1 is continuous. The decolorized liquid may be recycled to the mill and used as fresh process liquid or may be returned to the water source.

A more detailed and diagrammatic illustration of the actual practice of the present invention and the apparatus and flow control employed in subjecting the process waste liquid to the sequence of operations is more clearly illustrated in FIG. 2. As can be seen, the paper mill process waste liquid is contained in a storage or holding tank 25 from which it proceeds through line 26 and is introduced at the top of vertically elongate carbonation tower 27 provided with an interior structure designed to provide maximum liquid/gas contact. Carbon dioxide gas is introduced through line 28 into the bottom of tower 27.

The tower 27 may be what is commonly known as a "bubble plate" column or it may be packed with a suitable inert packing such as "Raschig" rings which are formed of ceramic and are designed to increase the surface over which introduced liquid flows in film form for contact with the gaseous carbon dioxide. It may be sufficient for the tower 27 to be provided with internal baffling such as to provide a convoluted or tortuous path for the liquid to pass counter-currently to the introduced carbon dioxide gas.

The relative amounts of process liquid and carbon dioxide are proportioned as to yield a carbonated liquid exiting through line 29 having a pH ranging from about 5.5 to about 8.3. The carbonated liquid is thusly passed via line 29 to mixer tank 30 equipped with a suitably driven rotatable mixer 31. Also introduced into the mixer tank 30 is an amount of lime mud proceeding from the lime mud storage tank 32 through line 33. The mixture of the lime mud and carbonated waste passes via line 34 to a secondary carbonation tower 35 identical to or similar to carbonation tower 27. Carbon dioxide is introduced near the bottom via line 36 in an amount to counteract the rise in pH caused by the addition of lime mud. The liquid in mixer tank 30, by reason of the composition of the carbonated waste, the presence of the calcium carbonate in the lime mud and the added $CO_2$, proceeds to the formation of highly soluble calcium bicarbonate which proceeds via line 34 in the manner indicated, while the heavier slurry in the mixture is drawn off the bottom through line 34a and is recirculated to the lime mud tank 32. The carbonation of the calcium bicarbonate liquid entering via line 34 favors a lowering of the pH and consequently a high concentration of calcium ion in the liquid. The calcium rich waste liquid is passed via line 37 to a clarifier tank 40. At the same time, a portion of the carbonated liquid, particularly that in the bottom regions of the carbonation tower 35, is passed via line 35a to merge with line 34a and return the combined slurry to the lime mud tank. The described recycling is continuous with relative flow rates controlled on the strength of experience as will provide a liquid effluent from the second carbonation tower 35 which is highly concentrated, as indicated, with calcium ion and of relatively neutral pH.

The clarifier tank 40 provided with suitable baffles 40a and an appropriately driven mixer 41 provides an intimate mixing of the carbonated, high-calcium-ion waste and the lime slurry in holding tank 43. The lime slurry of calcium oxide and calcium hydroxide is introduced through line 44, causing a rapid elevation of the pH of the mixture, causing precipitation of calcium carbonate which together with calcium oxide and calcium hydroxide proceeds to the bottom of tank 40 and is directed via line 46 to the lime tank 43 for reintroduction through line 44. Slurry is also bled from line 46 and directed to the lime kiln for burning.

Liquid effluent from tank 40, rich in calcium ion and at elevated pH by reason of the slaked lime addition, proceeds via line 47 to carbonation tower 50 which is similar to or identical to carbonation towers 35 and 27. Gaseous carbon dioxide is introduced at the bottom of the tower through line 52, lowering the pH and reacting, via intimate gas/liquid contact, with residual calcium to form calcium carbonate which is precipitated as a fluffy residual precipitate carrying residual agglomerated color bodies 53 admixed therewith and gathering at the bottom of the tank or tower 50.

A portion of the liquid in the tower 50 is recirculated via line 54 to promote stabilization of the pH and also to assist in a settling and/or clarification of precipitated solids including color bodies by the movement of the liquid downwardly through the settled precipitate 53.

The effluent of carbonation tower 50 is passed via line 55 to a further carbonation tower 56 similar to and/or identical to carbonation tower 50. Carbon dioxide gas or other equivalent is introduced via line 58 at the bottom of the tower. The additional carbonation may or may not be necessary to reduce the pH to the saturation point of the calcium carbonate, depending on the character of the solution, which normally is desirably in the range of about 7.5. Effluent from this last carbonation tower exits via line 60 and is identified in the drawing as decolorized waste. The practice of the sequence of operations, additions and the flow of the liquid as just described has been found to result in color removals in the range of 90 to 95 percent.

It will be appreciated that in place of the clarification tank 40, there may be employed a simple mixing tank or an "in line mixer" for combining the effluent from the carbonation tower 35 and the lime slurry from supply tank 43; following which, the liquid would be passed through a drum filter of the type frequently employed in the separation of precipitate from carrier liquid. These filters, frequently called vacuum filters, are well known in the art as being efficient for the separation of a precipitate from the mother liquid.

The illustration in FIG. 2, in the interest of simplicity and clarity, has not included pumps, valves and/or flow meters since the installation and operation of these instruments and control devices is certainly well known, well understood and would be conventionally employed in the usual and normal way.

Each of the stages of the process and/or sequence of steps as outlined, which involve the formation of and separation of a precipitate, additionally serve as a conjoint separation or removal of color bodies. Thus, the first stage insolubility product is a molecule of calcium salt. Continued salt formation and ultimate precipitation and attraction of like molecules forms a fluffy floc which acts to sweep out color bodies as it moves in the liquid. Additionally, of course, the cohering together of the multiple molecules results in an adsorption thereon of color bodies. As has been described earlier, the coloration-imparting entities or color bodies are themselves extremely small; in fact, minute. The conjoint separation of color bodies by the adsorption of being attracted to the formed precipitate is accomplished most effectively in accordance with the practice of the present invention. The fact that the present invention provides for a plurality of precipitation stages is believed in part responsible for the efficacious and efficient removal of color bodies.

It is a feature of the present invention that the treatment with the lime is found to result in a precipitate which can be filtered, contrary to prior experience in the utilization of the so-called "excess lime" treatment of paper mill waste process liquid wherein the addition of insufficient lime resulted in the formation of a gelatinous sludge. The formation of a gelatinous, difficult to handle, precipitate sludge can be reduced by using inordinately large amounts of lime (3,300 ppm plus) which, of course, is economically unattractive and, as well, undesirable in the volume of material which must be handled. In accordance with the present invention, however, the lime is found to be utilized in economical quantities as determined by the amount necessary to combine with the liquid introduced at, for example, step 18 and still be sufficient to raise the pH to the desired level as to effect formation and ultimate precipitation of calcium carbonate, usually in the neighborhood of 12.5.

Principally, of course, the primary concept or embodiment of the present invention envisions a conditioning of process waste liquid by (1) a carbonation, (2) a lime mud addition of cheap calcium, (3) a further carbonation pretreatment to provide a pH as to be most efficiently treated with lime to effect formation of calcium carbonate and elevation of pH and, finally, (4) a post-lime carbonation to lower pH and precipitate the calcium carbonate with conjoint agglomeration separation of color bodies.

A particularly desirable advantage of the practice of the process of the present invention resides in the finding that the precipitates formed in the various stages and particularly upon the addition of lime and the subsequent carbonation are not gelatinous and therefore easily filtered, separated or otherwise handled. The so-called "excess" or "massive lime" treatment literally requires a large excess of lime in order to avoid the gelatinous precipitate which is difficult to handle. The practice of the present invention permits the employment of relatively cheap and available lime mud composed of calcium carbonate, thereby obviating the necessity of large amounts of expensive lime.

It is also a unique feature of the present invention that the calcium carbonate in the lime mud is converted into calcium bicarbonate, providing a high concentration of calcium ion in the waste. This feature is made possible by the dual functionality of the precarbonation step wherein the carbon dioxide present serves to lower the pH and promotes conversion of calcium carbonate to soluble calcium bicarbonate. This latter, of course, in effect reduces the demand for expensive lime wherein amounts of the latter are needed only to raise the pH to the level noted, namely, about 12.0 and above, which in turn provides a proper environment for precipitation of the flocculent calcium carbonate. It is the combination of and sequence of steps as described which is found to be significantly fortuitous in the achievement of the desired result; namely, the removal of color bodies carried by the flocculent precipitate of calcium carbonate.

The controlled lowering of the pH afforded by the carbon dioxide as described hereinabove may, within the broader aspects of the present invention, be provided by other substances or mediums such as flue gases. Carbon dioxide, on the other hand, is particularly suited because of its availability, low cost and compatibility with the components of the liquid system involved. Most desirably, the use of strong or violent reacting substances to effect pH adjustment are avoided because of undesirable side effects.

As this invention may be embodied in several forms without departing from the spirit or essential characteristics thereof, the presently described embodiment is to be considered illustrative and not restricted since the scope of the invention is, in fact, defined by the appended claims and all changes or modifications that fall within the metes and bounds of the claims or that form functional as well as conjointly cooperative equivalents are intended to be embraced by the appended claims.

I claim:

1. A method of treating discolored paper mill process waste liquid to remove color bodies which impart objectionable coloration to said waste liquid, said method comprising the following steps in sequence:
   1. carbonating said discolored process waste liquid to adjust the pH to approximate neutrality,
   2. mixing into said carbonated liquid an amount of lime mud consisting essentially of calcium carbonate, $CaCO_3$, forming soluble calcium bicarbonate, $Ca(HCO_3)_2$,
   3. combining said resultant solution with a slurry, of at least one of the group calcium oxide and calcium hydroxide, thereby raising the pH sufficient to initiate precipitation of calcium carbonate and conjoint agglomeration of color bodies, and
   4. separating the precipitate and color bodies from the liquid.

2. The method as claimed in claim 1 which includes the following steps:
   5. carbonating the separated effluent from step (4) to effect (a) precipitation of residual calcium salt, (b) conjoint agglomeration separation of residual color bodies and (c) further reduction of the pH of the effluent liquid,
   6. recirculating carbonated liquid in contact with said precipitate to stabilize said liquid and
   7. recarbonating step (5) liquid as needed to reduce the pH to approximately 7.5.

3. The method as claimed in claim 1, wherein step (1) carbonation with $CO_2$ yields a pH ranging from about 5.5 to about 8.3.

4. The method as claimed in claim 1, wherein said lime mud is introduced in plentiful excess, stoichiometrically based on the amount of carbon dioxide employed in step (1).

5. The method as claimed in claim 1 which includes the step of carbonating the product of step (2).

6. The method as claimed in claim 1, wherein the product of mixing lime mud into the carbonated liquid is recarbonated before combining with the slurry as recited in step (3).

7. The method as claimed in claim 6, wherein a part of the secondary carbonation product and a part of the product of step (2) are recirculated to the source of lime mud for reintroduction in step (2).

8. The method as claimed in claim 1, wherein a portion of the product of step (3) is continuously recirculated into the slurry of one of the group calcium oxide and calcium hydroxide.

9. The method as claimed in claim 7, wherein the slurry product of step (3) is continuously recirculated into the slurry of one of the group calcium oxide and calcium hydroxide.

10. The method as claimed in claim 9, wherein an amount of slurry is bled off and burned in a lime kiln.

11. A method of treating discolored paper mill process waste liquid to remove color bodies which impart objectionable coloration to said waste liquid, said method comprising the following steps in sequence:
   1. carbonating said discolored process waste liquid in order to adjust the pH thereof to approximate neutrality,
   2. mixing into said neutralized waste an amount of lime mud consisting essentially of calcium carbonate, $CaCO_3$, forming calcium bicarbonate,
   3. adjusting the pH of the step (2) liquid to counteract the pH elevation caused by the addition of the calcium carbonate,
   4. combining, with the resultant of the preceding step, an amount of at least one of the group calcium oxide and calcium hydroxide sufficient to raise the pH to the saturation point of calcium carbonate, resulting in the initiation of precipitation of calcium carbonate and conjoint agglomeration of color bodies, and
   5. separating the precipitate and color bodies from the liquid.

12. The method as claimed in claim 11, wherein the steps recited are carried out continuously with recirculation of lime mud addition product of step (2) to lime mud source and recirculation of step (3) liquid to the source of one of the group calcium oxide and calcium hydroxide.

13. A method of treating discolored paper mill process waste liquid to remove color bodies which impart objectionable coloration to said waste liquid, said method comprising the following steps in sequence:
1. carbonating said discolored process waste liquid by the addition of carbon dioxide to a pH of about 5.5 to about 8.3,
2. mixing into said carbonated and neutralized liquid an amount of lime mud consisting essentially of calcium carbonate, said carbonate at the essentially neutral pH and in the presence of carbon dioxide being essentially converted to soluble calcium bicarbonate, $Ca(HCO_3)_2$,
3. recarbonating the step (2) liquid throughput to counteract the alkalinity of the added calcium carbonate and promote a formation of a liquid throughput rich in calcium ion,
4. combining the step (3) throughput liquid with a slurry of at least one of the group calcium oxide and calcium hydroxide sufficient in amount to raise the pH to the saturation concentration of calcium carbonate, effecting precipitation of calcium carbonate and conjoint agglomeration of color bodies,
5. recycling the liquid of step (4) to the source of said slurry composed of at least one of the group calcium oxide and calcium hydroxide for reintroduction in step (4),
6. clarifying the step (4) liquid,
7. carbonating, by the addition of carbon dioxide, the clarifier effluent of the preceding step to lower the pH and further precipitate residual calcium carbonate,
8. recarbonating effluent from the preceding step to adjust the pH to approximate neutrality and
9. separating precipitated calcium carbonate and color bodies.

* * * * *